US012322383B2

United States Patent
Bijwadia et al.

(10) Patent No.: US 12,322,383 B2
(45) Date of Patent: Jun. 3, 2025

(54) PREDICTING WORD BOUNDARIES FOR ON-DEVICE BATCHING OF END-TO-END SPEECH RECOGNITION MODELS

(71) Applicant: Google LLC, Mountain View, CA (US)

(72) Inventors: Shaan Jagdeep Patrick Bijwadia, San Francisco, CA (US); Tara N. Sainath, Jersey City, NJ (US); Jiahui Yu, Mountain View, CA (US); Shuo-yiin Chang, Sunnyvale, CA (US); Yangzhang He, Mountain View, CA (US)

(73) Assignee: Google LLC, Mountain View, CA (US)

( * ) Notice: Subject to any disclaimer, the term of this patent is extended or adjusted under 35 U.S.C. 154(b) by 254 days.

(21) Appl. No.: 17/934,184

(22) Filed: Sep. 21, 2022

(65) Prior Publication Data
US 2023/0107493 A1    Apr. 6, 2023

Related U.S. Application Data

(60) Provisional application No. 63/262,141, filed on Oct. 5, 2021.

(51) Int. Cl.
*G10L 15/05* (2013.01)
*G06N 3/045* (2023.01)
(Continued)

(52) U.S. Cl.
CPC ............ *G10L 15/183* (2013.01); *G10L 15/05* (2013.01); *G10L 15/26* (2013.01)

(58) Field of Classification Search
CPC ....... G10L 15/183; G10L 15/18; G10L 15/05; G10L 15/26; G10L 15/063; G10L 15/06;
(Continued)

(56) References Cited

U.S. PATENT DOCUMENTS

2002/0013702 A1\*  1/2002  Lee .................. G10L 15/16
                                                    704/E15.017
2007/0225972 A1\*  9/2007  Kim ................. G10L 25/93
                                                    704/210
(Continued)

OTHER PUBLICATIONS

Meng Li et al "Long-Running Speech Recognizer: An End-to-End Multi-Task Learning Framework for Online ASR and VAD", IDS, arxiv.org, pp. 1-5, Mar. 2, 2021.\*

(Continued)

*Primary Examiner* — Leshui Zhang
(74) *Attorney, Agent, or Firm* — Honigman LLP; Brett A. Krueger; Grant Griffith

(57) ABSTRACT

A method includes receiving a sequence of input audio frames corresponding to an utterance captured by a user device, the utterance including a plurality of words. For each input audio frame, the method includes predicting, using a word boundary detection model configured receive the sequence of input audio frames as input, whether the input audio frame is a word boundary. The method includes batching the input audio frames into a plurality of batches based on the input audio frames predicted as word boundaries, wherein each batch includes a corresponding plurality of batched input audio frames. For each of the plurality of batches, the method includes processing, using a speech recognition model, the corresponding plurality of batched input audio frames in parallel to generate a speech recognition result.

26 Claims, 7 Drawing Sheets

(51) Int. Cl.
| | |
|---|---|
| *G06N 3/0455* | (2023.01) |
| *G06N 3/048* | (2023.01) |
| *G06N 3/0499* | (2023.01) |
| *G06N 3/09* | (2023.01) |
| *G06N 3/096* | (2023.01) |
| *G10L 15/06* | (2013.01) |
| *G10L 15/16* | (2006.01) |
| *G10L 15/183* | (2013.01) |
| *G10L 15/26* | (2006.01) |
| *G10L 15/32* | (2013.01) |

(58) Field of Classification Search
CPC ......... G10L 15/16; G10L 15/32; G10L 15/22; G10L 15/02; G10L 15/08; G10L 15/1815; G10L 15/005; G10L 15/065; G10L 15/197; G10L 15/04; G10L 15/00; G10L 13/047; G10L 13/02; G10L 13/033; G10L 13/00; G10L 13/08; G06N 3/0442; G06N 3/045; G06N 3/0455; G06N 3/0499; G06N 3/048; G06N 3/09; G06N 3/096
USPC .... 704/9, 231, 270, 15.006, 15.004, 15.005, 704/251, 253, 254; 706/10, 12, 15, 16, 706/17, 18, 20, 21, 22, 24, 25, 41, 42, 43
See application file for complete search history.

(56) References Cited

U.S. PATENT DOCUMENTS

| | | | | |
|---|---|---|---|---|
| 2021/0217410 | A1* | 7/2021 | Khalil | G10L 15/02 |
| 2023/0096821 | A1* | 3/2023 | Huang | G10L 15/16 |
| | | | | 704/235 |

OTHER PUBLICATIONS

Shuo-Yiin Chang, et al "A Unified Endpointer Using Multitask and Multidomain Training", 2019 IEEE Automatic Speech Recognition and Understanding Workshop ASRU, pp. 100-106 (Year: 2019).*

Meng Li et al "Long-Running Speech Recognizer: An End-to-End Multi-Task Learning Framework for Online ASR and VAD", IDS, arxiv.org, pp. 1-5, Mar. 2, 2021, contained in IDS submitted on Feb. 16, 2023.*

Peng et al. "Interactive Learing of Teacher-Student Model for Short Utterance Spoken Language Identification", IEEE Xplore, ICASSP 2019, 2019 IEEE International Conference on Acoustics, Speech and Signal Processing, p. 5981-5985 (Year: 2019).*

Zhang et al. "Transformer Transducer: A streamable Speech Recognition Model with Transformer Encoders and RNN-T Loss", IEEE Xplore, ICASSP 2020-2020 IEEE International Conference on Acoustics, Speech and Signal Processing, p. 7829-7833 (Year : 2020).*

International Search Report and Written Opinion relating to Application No. PCT/US2022/076822, dated Dec. 9, 2022.

Meng Li et al: "Long-Running Speech Recognizer:An End-to-End Multi-Task Learning Framework for Online ASR and VAD", arxiv.org <http://arxiv.org>, Cornell University Library, 201 Olin Library Cornell University Ithaca, NY 14853, Mar. 2, 2021 (Mar. 2, 2021), XP081904489, sections 1, 2.2, 2.4 Algorithm 1.

Yoshimura Takenori et al: "End-to-End Automatic Speech Recognition Integrated with CTC-Based Voice Activity Detection", ICASSP 2020—2020 IEEE International Conference on Acoustics, Speech and Signal Processing (ICASSP), IEEE, May 4, 2020 (May 4, 2020), pp. 6999 7003, XP033793984, DOI: 10.1109/ICASSP40776.2020.9054358 [retrieved on Apr. 1, 2020]figure 1 section 2.1.

Shen Peng et al: "Automatic acoustic segmentation in N-best list rescoring for lecture speech recognition", 2016 10th International Symposium on Chinese Spoken Language Processing (ISCSLP), IEEE, Oct. 17, 2016 (Oct. 17, 2016), pp. 1-5, XP033092542, DOI: 10.1109/ISCSLP.2016.7918409 [retrieved on May 2, 2017] figures 1-5 sections 2, 3.1.

Sainath Tara N. et al: "Emitting Word Timings with End-to-End Models", INTERSPEECH 2020, Oct. 25, 2020 (Oct. 25, 2020), pp. 3615-3619, XP093002765, ISCA DOI: 10.21437/Interspeech.2020-1059 Retrieved from the Internet: URL:<https://www.iscaspeech.org/archive_y0>/Interspeech_2020/pdfs/1059.pdf> figure 1 sections 2, 3.

* cited by examiner

PREDICTING WORD BOUNDARIES FOR ON-DEVICE BATCHING OF END-TO-END SPEECH RECOGNITION MODELS

CROSS REFERENCE TO RELATED APPLICATIONS

This U.S. Patent Application claims priority under 35 U.S.C. § 119(e) to U.S. Provisional Application 63/262,141, filed on Oct. 5, 2021, The disclosure of this prior application is considered part of the disclosure of this application and is hereby incorporated herein by reference in its entirety.

TECHNICAL FIELD

This disclosure relates to predicting word boundaries for on-device batching of end-to-end speech recognition models.

BACKGROUND

Modern automatic speech recognition (ASR) systems focus on providing not only high quality (e.g., a low word error rate), but also low latency (e.g., a short delay between the user speaking and a transcription appearing) speech recognition for spoken utterances. For example, when using a device that implements an ASR system, there is often an expectation that the ASR system decodes utterances in a streaming fashion that corresponds to real-time or even faster than real-time. To illustrate, when an on-device ASR system is deployed on a mobile phone that experiences direct user interactivity, an application on the mobile phone using the ASR system may require the speech recognition to be streaming such that words appear on the screen as soon as they are spoken. Here, it is also likely that the user of the mobile phone has a low tolerance for latency. Due to this low tolerance, the speech recognition strives to run on the mobile device in a manner that minimizes an impact from latency and inaccuracy that may detrimentally affect the user's experience.

SUMMARY

One aspect of the disclosure provides a method including receiving a sequence of input audio frames corresponding to an utterance captured by a user device, the utterance including a plurality of words. For each input audio frame, the method includes predicting, using a word boundary detection model configured receive the sequence of input audio frames as input, whether the input audio frame is a word boundary. The method batches the input audio frames into a plurality of batches based on the input audio frames predicted as word boundaries, wherein each batch includes a corresponding plurality of batched input audio frames. For each of the plurality of batches, the method includes processing, using a speech recognition model, the corresponding plurality of batched input audio frames in parallel to generate a speech recognition result.

Implementations of the disclosure may include one or more of the following optional features. In some implementations, the word boundary detection model includes a voice activity detection (VAD) model.

In some examples, the speech recognition model includes a first speech recognition model, and the word boundary detection model includes a second speech recognition model trained using transcript labels augmented with a special boundary token between each pair of adjacent words. In some implementations, the transcript labels are tokenized into wordpiece units, and the first speech recognition model predicts wordpiece units to generate the speech recognition result. In some examples, the first speech recognition model is trained as a teacher model using the transcript labels augmented with the special boundary token between each pair of words, and the second speech recognition model is trained as a student model by performing gradient grafting that determines a loss of logits of the teacher model and applies a gradient of the loss of logits of the teacher model to weights of the student model. In some implementations, the second speech recognition model includes a miniaturized speech recognition model.

In some implementations, a first batch of the plurality of batches contains a first number of input audio frames of the sequence of input audio frames, and a second batch of the plurality of batches contains a different second number of input audio frames of the sequence of input audio frames. In some examples, the input audio frames of the first batch represent a first spoken word, and the input audio frames of the second batch represent a different second spoken word. In some implementations, each batch of the plurality of batches includes all of the input audio frames of the sequence of input audio frames representing a particular spoken word in its entirety.

In some implementations, the speech recognition model includes a transducer-based speech recognition model that has an encoder network, a prediction network, and a joint network. In some examples, the encoder network includes a plurality of multi-headed attention layers.

In some examples, the prediction network is configured to, at each of a plurality of time steps subsequent to an initial time step receive, as input, a sequence of non-blank symbols output by a final softmax layer. At each of the plurality of time steps and for each non-blank symbol in the sequence of non-blank symbols received as input at the corresponding time step, the prediction network is configured to generate, using a shared embedding matrix, an embedding of the corresponding non-blank symbol; assign a respective position vector to the corresponding non-blank symbol; and weight the embedding proportional to a similarity between the embedding and the respective position vector. The prediction network is further configured to generate, as output, a single embedding vector at the corresponding time step, the single embedding vector based on a weighted average of the weighted embeddings. In some implementations the joint network is configured to, at each of the plurality of time steps subsequent to the initial time step: receive, as input, the single embedding vector generated as output from the prediction network at the corresponding time step; and generate a probability distribution over possible speech recognition hypotheses at the corresponding time step. in some examples, the prediction network ties a dimensionality of the shared embedding matrix to a dimensionality of an output layer of the joint network.

Another aspect of the disclosure provides a system including data processing hardware and memory hardware in communication with the data processing hardware. The memory hardware storing instructions that when executed on the data processing hardware cause the data processing hardware to perform operations including receiving a sequence of input audio frames corresponding to an utterance captured by a user device, the utterance including a plurality of words. For each input audio frame, the operations include predicting, using a word boundary detection model configured receive the sequence of input audio frames as input, whether the input audio frame is a word boundary.

The operations include hatching the input audio frames into a plurality of batches based on the input audio frames predicted as word boundaries, wherein each batch includes a corresponding plurality of batched input audio frames. For each of the plurality of batches, the operations include processing, using a speech recognition model, the corresponding plurality of batched input audio frames in parallel to generate a speech recognition result.

Implementations of the disclosure may include one or more of the following optional features. In some implementations, the word boundary detection model includes a voice activity detection (VAD) model.

In some examples, the speech recognition model includes a first speech recognition model, and the word boundary detection model includes a second speech recognition model trained using transcript labels augmented with a special boundary token between each pair of adjacent words. In some implementations, the transcript labels are tokenized into wordpiece units, and the first speech recognition model predicts wordpiece units to generate the speech recognition result. In some examples, the first speech recognition model is trained as a teacher model using the transcript labels augmented with the special boundary token between each pair of words, and the second speech recognition model is trained as a student model by performing gradient grafting that determines a loss of logits of the teacher model and applies a gradient of the loss of logits of the teacher model to weights of the student model. In some implementations, the second speech recognition model includes a miniaturized speech recognition model.

In some implementations, a first batch of the plurality of batches contains a first number of input audio frames of the sequence of input audio frames, and a second batch of the plurality of batches contains a different second number of input audio frames of the sequence of input audio frames. In some examples, the input audio frames of the first hatch represent a first spoken word, and the input audio frames of the second batch represent a different second spoken word. In some implementations, each batch of the plurality of batches includes all of the input audio frames of the sequence of input audio frames representing a particular spoken word in its entirety.

In some implementations, the speech recognition model includes a transducer-based speech recognition model that has an encoder network, a prediction network, and a joint network. In some examples, the encoder network includes a plurality of multi-headed attention layers.

In some examples, the prediction network is configured to, at each of a plurality of time steps subsequent to an initial time step receive, as input, a sequence of non-blank symbols output by a final softmax layer. At each of the plurality of time steps and for each non-blank symbol in the sequence of non-blank symbols received as input at the corresponding time step, the prediction network is configured to generate, using a shared embedding matrix, an embedding of the corresponding non-blank symbol; assign a respective position vector to the corresponding non-blank symbol; and weight the embedding proportional to a similarity between the embedding and the respective position vector. The prediction network is further configured to generate, as output, a single embedding vector at the corresponding time step, the single embedding vector based on a weighted average of the weighted embeddings. In some implementations the joint network is configured to, at each of the plurality of time steps subsequent to the initial time step: receive, as input, the single embedding vector generated as output from the prediction network at the corresponding time step; and generate a probability distribution over possible speech recognition hypotheses at the corresponding time step. in some examples, the prediction network ties a dimensionality of the shared embedding matrix to a dimensionality of an output layer of the joint network.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
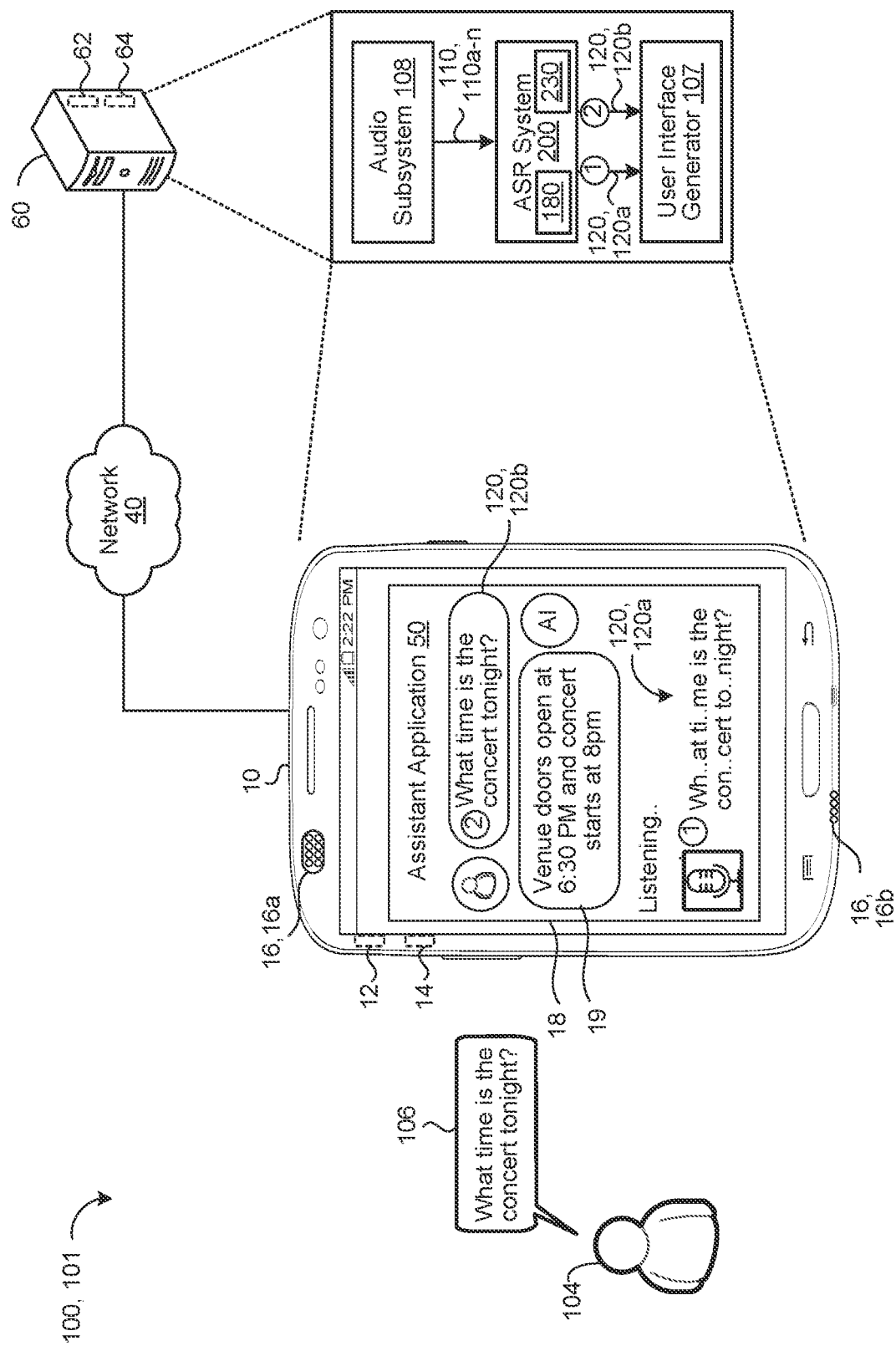
FIG. 1 is a schematic view of an example speech environment using an automatic speech recognition (ASR) system for transcribing speech.

While transcription quality (e.g., measured by word error rate (WER)) is important for any ASR system, latency and power consumption are often especially important for on-device ASR systems (e.g., an ASR system implemented on or by a user device). That is, on-device ASR systems often face a tradeoff between battery usage and the amount of computations to be performed. For example, while large speech recognition models are generally more accurate, they often have higher computational costs and, thus, higher power consumption.

Batching of input audio frames can improve battery usage for on-device ASR systems. That is, ASR systems can advantageously batch a large number of discrete input audio frames, and compute speech recognition predictions at all batched frame times in parallel. However, batching input audio frames can increase latency and, in some instances, reduce speech recognition accuracy. That is, the time it takes for the ASR system to recognize an uttered word and output a transcription thereof may increase.

One way to induce a better computation-latency tradeoff and maintain speech recognition quality is to batch together sets or batches of input audio frames that represent full words. In such a scheme, each spoken word is represented, in its entirety, by a single batch of sequential input audio frames, such that each batch of input audio frames ends at effectively the same time that the ASR system is first able to emit a transcription of the spoken word. In the ideal case, this reduces or minimizes latency, because the transcription for the word can be emitted immediately after the batch of input audio frames is processed. That is, there may be no additional latency even while hatch sizes are as large as individual words, including possibly any preceding silence. To implement such a scheme, it is important to quickly, accurately, and reliably identify word boundaries in a stream of input audio frames (i.e., the particular input audio frame corresponding to the end of each spoken word), such that processing, by a speech recognition model, of the corresponding hatch of input audio frames can begin immediately following each detected word end boundary.

Examples disclosed herein use word boundary detection to predict word boundaries in speech recognition outputs, and use the predicted word boundaries to batch input audio frames into batches of input audio frames that each represent a corresponding whole spoken word. That is, the predicted word boundaries may be used to correlate end of word timings for the input audio frames. Disclosed examples do not affect speech recognition quality or final WER because the underlying speech recognition model does not need to be changed in the examples disclosed herein. Moreover, because the size of each hatch of input audio frames is dynamically and individually maximized to correspond to whole spoken words, battery usage is reduced or minimized. Furthermore, latency is not increased because each batch of input audio frames ends at a respective word boundary. In some implementations, a method includes receiving a sequence of input audio frames corresponding to an utterance captured by a user device. Here, the utterance includes a plurality of words. For each input audio frame, the method may include predicting, using a word boundary detection model configured receive the sequence of input audio frames as input, whether the input audio frame is a word boundary. In these implementations, the method also includes batching the input audio frames into a plurality of batches based on the input audio frames predicted as word boundaries. Here, each batch includes a corresponding plurality of batched input audio frames. Then, for each of the plurality of batches, the method may include processing, using a speech recognition model, the corresponding plurality of batched input audio frames in parallel to generate a speech recognition result.

FIG. 1 is a schematic view of an example system 100 operating in a speech environment 101. In the speech environment 101, a user's 104 manner of interacting with a computing device, such as a user device 10, may be through voice input. The user device 10 (also referred to generally as a device 10) is configured to capture sounds (e.g., streaming audio data) from one or more users 104 within the speech environment 101. Here, the streaming audio data may refer to a spoken utterance 106 by the user 104 that functions as an audible query, a command for the device 10, an audible communication captured by the device 10, etc. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 101 into electrical signals and a speech output device (e.g., a speaker) 16, 16b for communicating an audible audio signal (e.g., as output audio data from the device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

The system 100 includes an automated speech recognition (ASR) system 200 implementing, among other things, a recurrent neural network-transducer (RNN-T) based speech recognition model 230 and an optional rescorer 180 resides on the user device 10 of the user 104 and/or on a remote computing device 60 (e.g., one or more remote or central servers of a distributed system executing in a cloud-computing environment) in communication with the user device 10 via a network 40. In some examples, the ASR system 200 is an end-to-end ASR system. The user device 10 and/or the remote computing device 60 also includes an audio subsystem 108 configured to receive the utterance 106 spoken by the user 104 and captured by the audio capture device 16a, and convert the utterance 106 into a corresponding digital format associated with input audio frames 110 capable of being processed by the ASR system 200. In the example shown, the user speaks a respective utterance 106 and the audio subsystem 108 converts the utterance 106 into corresponding input audio data (e.g., input acoustic or audio frames) 110 for input to the ASR system 200. Thereafter, the RNN-T model 230 receives, as input, the audio data 110, or batches thereof, corresponding to the utterance 106, and generates/predicts, as output, a corresponding transcription 120 (e.g., recognition result/hypothesis) of the utterance 106. In the example shown, the RNN-T model 230 may perform streaming speech recognition to produce an initial speech recognition result 120, 120a and the rescorer 180 may update (i.e., rescore) the initial speech recognition result 120a to produce a final speech recognition result 120, 120b. The server 60 includes data processing hardware 62, and memory hardware 64 in communication with the data processing hardware 62. The memory hardware 64 stores instructions that, when executed by the data processing hardware 62, cause the data processing hardware 62 to perform one or more operations, such as those disclosed herein.

The user device 10 and/or the remote computing device 60 also executes a user interface generator 107 configured to present a representation of the transcription 120 of the utterance 106 to the user 104 of the user device 10. As described in greater detail below, the user interface generator 107 may display the initial speech recognition results 120a in a streaming fashion during time 1 and subsequently display the final speech recognition result 120b during time 2. In some configurations, the transcription 120 output from the ASR system 200 is processed, e.g., by a natural language processing/understanding (NLP/NLU) module executing on the user device 10 or the remote computing device 60, to execute a user command/query specified by the utterance 106. Additionally or alternatively, a text-to-speech (TSS) system (not shown) (e.g., executing on any combination of the user device 10 or the remote computing device 60) may convert the transcription into synthesized speech for audible output by the user device 10 and/or another device.

In the example shown, the user 104 interacts with a program or application 50 (e.g., a digital assistant application 50) executing on the user device 10 that uses the ASR system 200. For instance, FIG. 1 depicts the user 104 communicating with the digital assistant application 50 and the user device 10 executing a graphical user interface 18 for display on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16*a* and processed by audio systems 16 of the user device 10. In this example, the audio system 16 receives the spoken utterance 106 and converts it into input audio frames 110 for input to the ASR system 200.

Continuing with the example, the RNN-T model 230, while receiving the audio frames 110, or batches thereof, corresponding to the utterance 106 as the user 104 speaks, encodes the audio frames 110, and then decodes the encoded audio frames 110 into the initial speech recognition results 120*a*. During time 1, the user interface generator 107 presents, via the digital assistant interface 18, a representation of the initial speech recognition results 120*a* of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistant interface 18, a representation of the final speech recognition result 120*b* of the utterance 106 to the user 104 of the user device 10 rescored by the rescorer 180. In some implementations, the user interface generator 107 replaces the representation of the initial speech recognition results 120*a* presented at time 1 with the representation of the final speech recognition result 120*b* presented at time 2. Here, time 1 and time 2 may include timestamps corresponding to when the user interface generator 107 presents the respective speech recognition result 120. In this example, the timestamp of time 1 indicates that the user interface generator 107 presents the initial speech recognition result 120*a* at an earlier time than the final speech recognition result 120*b*. For instance, as the final speech recognition result 120*b* is presumed to be more accurate than the initial speech recognition results 120*a*, the final speech recognition result 120*b* ultimately displayed as the transcription 120 may fix any terms that may have been misrecognized in the initial speech recognition results 120*a*. In this example, the streaming initial speech recognition results 120*a* output by the RNN-T model 230 are displayed on the screen of the user device 10 at time 1 are associated with low latency and provide responsiveness to the user 104 that his/her query is being processed, while the final speech recognition result 120*b* output by the rescorer 180 and displayed on the screen at time 2 leverages an additional speech recognition model and/or a language model to improve the speech recognition quality in terms of accuracy, but at increased latency. However, since the initial speech recognition results 120*a* are displayed as the user speaks the utterance 106, the higher latency associated with producing, and ultimately displaying the final recognition result is not noticeable to the user 104.

In the example shown in FIG. 1, the digital assistant application 50 may respond to the question posed by the user 104 using NLP/NLU processing. NLP/NLU generally refers to a process of interpreting written language (e.g., the initial speech recognition results 120*a* and/or the final speech recognition result 120*b*) and determining whether the written language prompts any action. In this example, the digital assistant application 50 uses NLP/NLU to recognize that the question from the user 104 regards the user's schedule and more particularly a concert on the user's schedule. By recognizing these details with NLP/NLU, the automated assistant returns a response 19 to the user's query where the response 19 states, "Venue doors open at 6:30 PM and concert starts at 8 pm." In some configurations, NLP/NLU occurs on a remote server 60 in communication with the data processing hardware 12 of the user device 10.

Figure 2:
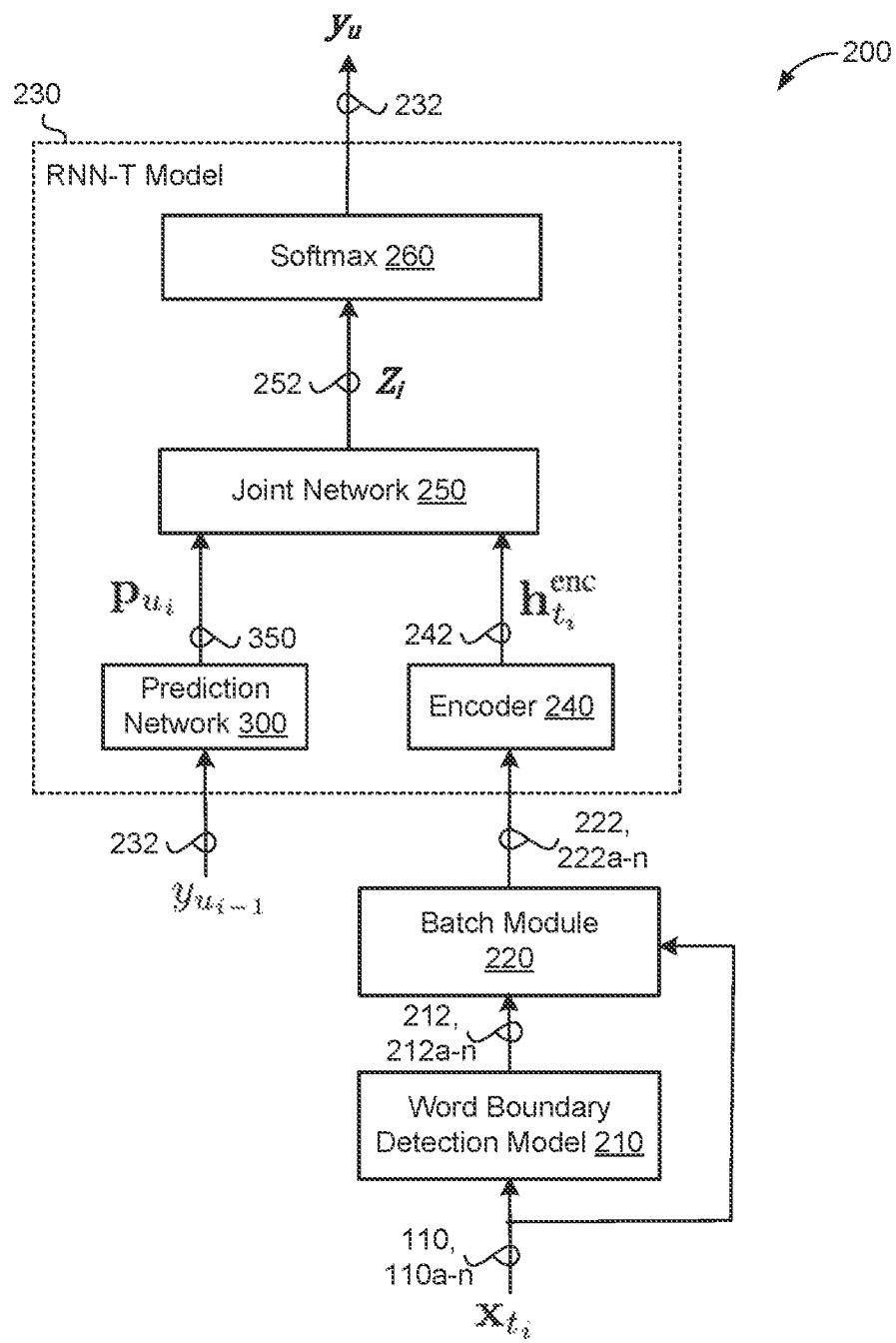
FIG. 2 is a schematic view of an example of the ASR system of FIG. 1.

FIG. 2 is a schematic view of an example of the ASR system 200 of FIG. 1 including a word boundary detection model 210, a batch module 220, and the RNN-T model 230. The word boundary detection model 210 processes input audio frames 110 to determine word boundaries. In particular, the word boundary detection model 210 is configured and trained to determine, for each particular input audio frame 110, an output 212 that represents whether or not the particular input audio frame 110 corresponds to a word boundary. That is, the word boundary detection model 210 identifies input audio frames 110 that represent boundaries between adjacent pairs of spoken words in the input audio frames 110 as word boundaries. In some examples, when the word boundary detection model 210 identifies a particular input audio frame 110 as a word boundary, the word boundary detection model 210 outputs a corresponding output 212 having a first value (e.g., representing a logical "TRUE"). Otherwise, the word boundary detection model 210 outputs a corresponding output 212 having a different second value (e.g., representing a logical "FALSE").

In some examples, the word boundary detection model 210 includes a voice activity detection (VAD) model configured and trained to determine an output 212 for each input audio frame 110 that represents whether the corresponding input audio frame 110 contains data representing spoken utterances.

In an additional or alternative implementation, the word boundary detection model 210 includes a speech recognition model configured and trained, for example, to use acoustic and text information to detect word boundaries. In some examples, the speech recognition model includes an RNN-T model, such as the RNN-T model 230. Here, the speech recognition model may be a smaller, reduced complexity, or miniaturized version of the RNN-T model 230. The speech recognition model includes an encoder that may be configured as a conformer with a cell width of 512 (e.g., containing 32 million parameters) or a cell width of 144 (e.g., containing 4 million parameters), and a decoder configured as an embedding decoder. In some examples, the word boundary detection model 210 is trained using sequence-level emission regularization to encourage the speech recognition model to more quickly identify word boundaries. In some additional examples, the word boundary detection model 210 is trained using supervised learning based on paired training data. Here, the paired training data includes audio-transcript pairs. That is, pairs of input audio frames 110 and corresponding ground-truth transcript labels that are augmented with special boundary tokens (e.g., "<wb>") inserted between pairs of adjacent words. Here, the transcript labels may be annotated by hand. However, the transcript labels may be generated or determined in any other way. In some examples, the RNN-T model 230 predicts wordpiece units while performing speech recognition, and the transcript labels are tokenized into wordpiece units.

In an additional or alternative implementation, the word boundary detection model 210 includes a speech recognition model configured and trained to predict the word boundaries predicted by the RNN-T model 230. In some examples, the speech recognition model includes an RNN-T model, such as the RNN-T model 230. Here, the speech recognition model may be a smaller, reduced complexity, or miniaturized version of the RNN-T model 230. The speech recognition model includes an encoder that may be configured as a conformer with a cell width of 512 (e.g., containing 32 million parameters) or a cell width of 144 (e.g., containing 4 million parameters), and a decoder configured as an embedding decoder. In some examples, the word boundary detection model 210 is trained using knowledge distillation and gradient grafting to learn to predict the word boundaries predicted by the RNN-T model 230. Here, training of the ASR system 200 uses the RNN-T model 230 as a teacher model for use in training the word boundary detection model 210 as a student model. During training, an additional loss is applied to the word boundary detection model 210 by computing a full or approximate KL-divergence between teacher and student predictions, that is, a lattice of conditional probabilities over word boundary detections. Here, the RNN-T model 230 is trained using the same type of paired training data of audio-transcript pairs described above. In an example, RNN-T losses are determined based on logits of the teacher model (i.e., the RNN-T model 230) during training of the teacher model with the paired training data, a gradient is determined based on the teacher model's logits, and the gradient is applied to the student model (i.e., the word boundary detection model 210) to train the student model. For example, given logits logits$_{teacher}$ of the teacher model (i.e., RNN-T 230), and logits logits$_{student}$ of the student model (i.e., word boundary detection model 210), logits for training the student model are computed as:

$$\text{logits}=\text{stop\_gradient}(\text{logits}_{teacher}-\text{logits}_{student})+\text{logits}_{student} \quad (1)$$

The logits of Equation (1) can be used to determine a weighted sum that is applied to a standard loss computed for and used to update the student model (i.e., the word boundary detection model 210). Alternatively, the logits of Equation (1) can be applied as a sole loss function that is used to update the student model (i.e., the word boundary detection model 210).

The batch module 220 batches the input audio frames 110 into one or more batches 222 that each represent a respective spoken word in its entirety. Each batch 222 includes a sequential plurality of the input audio frames 110 that together represent a corresponding spoken word. The batch module 220 segments the input audio frames 110 into the batches 222 based on the outputs 212 of the word boundary detection model 210 that identify which audio input frames 110 correspond to word boundaries. The batch module 220 uses these identified word boundaries to delineate sequential pluralities of the input audio frames 110 into the batches 222. Because the batch module 220 batches the input audio frames 110 based on the word boundaries identified by the word boundary detection model 210 and spoken words may be of different lengths, the batches 222 may include different numbers of input audio frames 110.

The RNN-T model 230 provides a small computational footprint and utilizes less memory requirements than conventional ASR architectures, making the RNN-T model 230 suitable for performing speech recognition entirely on the user device 102 (e.g., no communication with a remote server is required).

As shown, the RNN-T model 230 includes an encoder network 240, a prediction network 300, a joint network 250, and a final softmax layer 260. The prediction and joint networks 300, 250 may collectively provide an RNN-T decoder. The encoder network 240, which is roughly analogous to an acoustic model (AM) in a traditional ASR system, may include a network of multi-head attention layers such as, without limitation, conformer or transformer layers. For instance, the encoder reads a batch 222 of d-dimensional feature vectors (e.g., a batch 222 of the input audio frames 110 (FIG. 1)) $x=(x_1, x_2, \ldots, x_T)$, where $x_t \in \mathbb{R}^d$, and produces at each time step a higher-order feature representation 242. This higher-order feature representation 242 is denoted as $h_1^{enc}, \ldots, h_T^{enc}$. In other examples, the encoder network 240 includes. In other examples, the encoder network 240 may include a recurrent network of stacked Long Short-Term Memory (LSTM) layers.

Similarly, the prediction network 300 is also an LSTM network, which, like a language model (LM), processes the sequence of non-blank symbols 232 output by the final softmax layer 260 so far, $y_0, \ldots, y_{ui-1}$, into a dense or hidden representation $p_{u_i}$ 350. Described in greater detail below, the representation $p_{u_i}$ 350 includes a single embedding vector. Notably, the sequence of non-blank symbols 232 received at the prediction network 300 capture linguistic dependencies between non-blank symbols 232 predicted during the previous time steps so far to assist the joint network 250 in predicting the probability of a next output symbol or blank symbol during the current time step. As described in greater detail below, to contribute to techniques for reducing the size of the prediction network 300 without sacrificing accuracy/performance of the RNN-T model 230, the prediction network 300 may receive a limited-history sequence of non-blank symbols 232 $y_{ui-n}, \ldots, y_{ui-1}$ that is limited to the N previous non-blank symbols 232 output by the final softmax layer 260.

Figure 3:
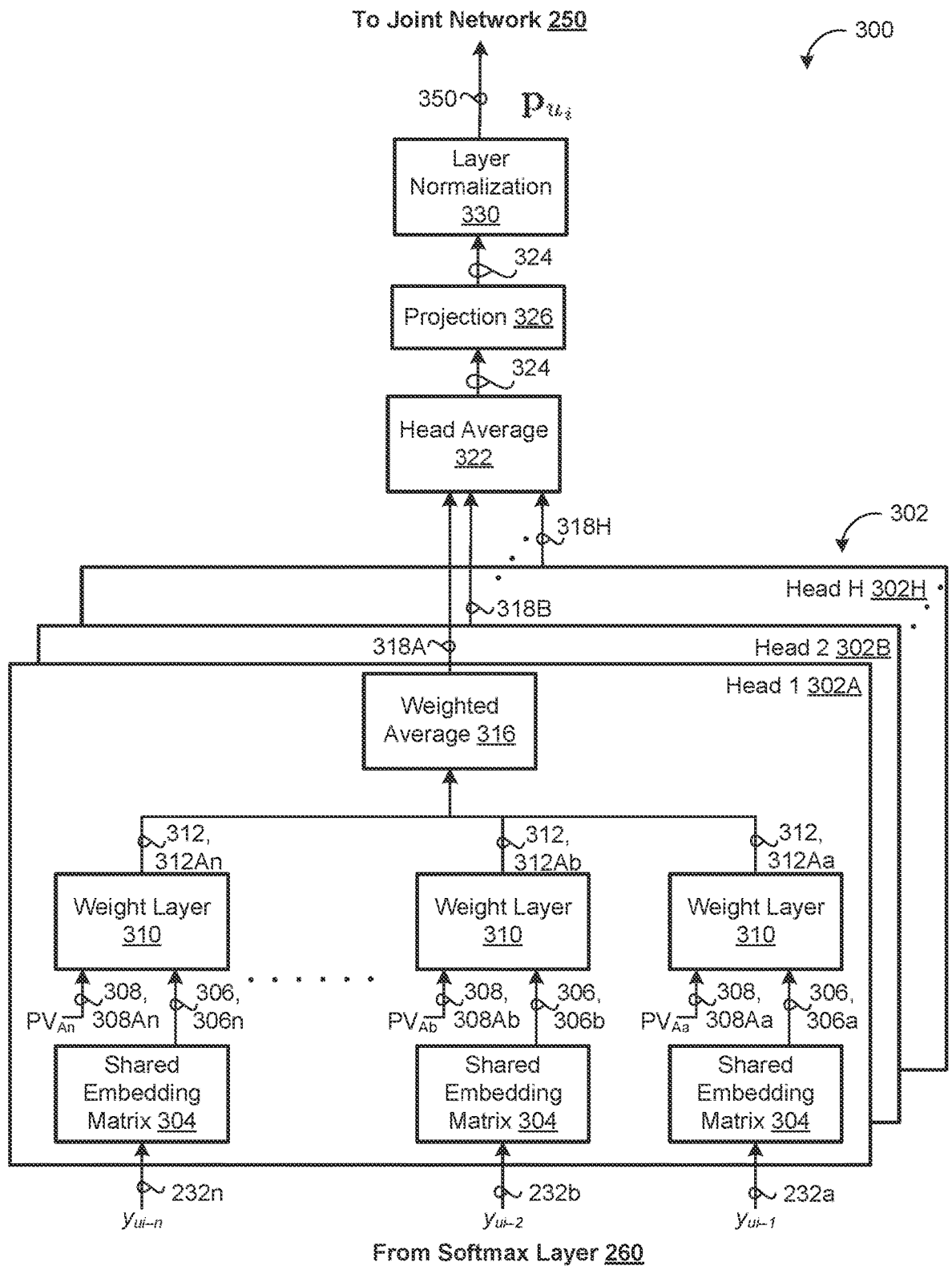
FIG. 3 is a schematic view of an example tied and reduced prediction network of the recurrent neural network-transducer (RNN-T) model of FIG. 2.

FIG. 3 shows the prediction network 300 of the RNN-T model 230 receiving, as input, a sequence of non-blank symbols 232 $y_{ui-n}, \ldots, y_{ui-1}$ that is limited to the N previous non-blank symbols 232a-n output by the final softmax layer 260. In some examples, N is equal to two. In other examples, N is equal to five, however, the disclosure is non-limiting and N may equal any integer. The sequence of non-blank symbols 232a-n indicates an initial speech recognition result 120a (FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306a-n (e.g., $X \in \mathbb{R}^{N \times d_e}$) for each non-blank symbol among the sequence of non-blank symbols 232a-n $y_{ui-n}, \ldots, y_{ui-1}$ received as input at the corresponding time step from the plurality of time steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the sequence of non-blank symbols 232a-n $y_{ui-n}, \ldots, y_{ui-1}$. The respective position vector PV 308 assigned to each non-blank symbol indicates a position in the history of the sequence of non-blank symbols (e.g., the N previous non-blank symbols 232a-n output by the final softmax layer 260), For instance, the first position vector $PV_{Aa}$ is assigned to a most recent position in the history, while the last position vector $PV_{An}$ is assigned to a last position in the history of the N previous non-blank symbols output by the final softmax layer 260. Notably, each of the embeddings 306 may include a same dimensionality (i.e., dimension size) as each of the position vectors PV 308.

While the corresponding embedding generated by shared embedding matrix 304 for each for each non-blank symbol among the sequence of non-blank symbols 232a-n, $y_{ui-n}, \ldots, y_{ui-1}$, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ 308$_{Ba-Bn}$, ..., and the $H^{th}$ head 302 H defines another different row of position vectors $PV_{Ha-Hn}$ 308$_{Ha-Hn}$.

For each non-blank symbol in the sequence of non-blank symbols 232a-n received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H*N} \sum_{h,n} X_n * \sum_{e} (X_{n,e} * P_{h,n,e}) \qquad (2)$$

In Equation (2), h represents the index of the heads 302, n represents position in context, and e represents the embedding dimension. Additionally, in Equation (2), H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A, are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector $p_{u_i}$ 350 at the corresponding time step from the plurality of time steps. The prediction network 300 generates only a single embedding vector $p_{u_i}$ 350 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector $p_{u_i}$ 350.

Referring back to FIG. 2, the higher-order feature representation $h_{t_i}^{enc}$ 242 produced by the encoder network 240 and the representation $p_{u_i}$ 350 (i.e., single embedding vector 350) produced by the prediction network 300 are combined by the joint network 250. The joint network 250 predicts a distribution 252 $Z_i = P(y_i | x_{t_i}, y_0, \ldots, y_{u_{i-1}})$ over the next output symbol. Stated differently, the joint network 250 generates, at each time step, a probability distribution 252 over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 250 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 250 can include a posterior probability value for each of the different output labels. Thus, if there are 100 different output labels representing different graphemes or other symbols, the output $Z_i$ 252 of the joint network 250 can include 100 different probability values, one for each output label. The probability distribution can then be used to select and assign scores to candidate orthographic elements (e.g., graphemes, wordpieces, and/or words) in a beam search process (e.g., by the softmax layer 260) for determining the transcription 120.

The final softmax layer 260 receives the probability distribution $Z_i$ 252 for the final speech recognition result 120b and selects the output label/symbol with the highest probability to produce the transcription. The final softmax layer 260 may employ any technique to select the output label/symbol with the highest probability in the distribution $Z_i$ 232. In this manner, the RNN-T model 230 does not make a conditional independence assumption, rather the prediction of each symbol $y_u$ 232 is conditioned not only on the acoustics but also on the sequence of labels 232 $y_{ui-n}, \ldots, y_{ui-1}$ output so far. The RNN-T model 230 does assume an output symbol 232 is independent of future audio frames 110, which allows the RNN-T model to be employed in a streaming fashion.

The final speech recognition result 120b is presumed to be more accurate than the initial speech recognition result 120a because the RNN-T model 230 determines the initial speech recognition results 120a in a streaming fashion and the final speech recognition results 120b using the prior non-blank symbols from the initial speech recognition result 120a. That is, the final speech recognition results 120b take into account the prior non-blank symbols and thus are presumed more accurate because the initial speech recognition results 120a do not take into account any prior non-blank symbols. Moreover, the rescorer 180 (FIG. 1) may update the initial speech recognition result 120a with the final speech recognition result 120b to provide the transcription via the user interface generator 170 to the user 104.

In some implementations, to further reduce the size of the RNN-T decoder (i.e., the prediction network 300 and the joint network 250), parameter tying between the prediction network 300 and the joint network 250 is applied. Specifically, for a vocabulary size |V| and an embedding dimension $d_e$, the shared embedding matrix 304 at the prediction network is $E \in \mathbb{R}^{|V| \times d_e}$. Meanwhile, a last hidden layer includes a dimension size $d_h$ at the joint network 250, feed-forward projection weights from the hidden layer to the output logits will be $W \in \mathbb{R}^{d_h \times |V|+1}$, with an extra blank token in the vocabulary. Accordingly, the feed-forward layer corresponding to the last layer of the joint network 250 includes a weight matrix $[d_h, |V|]$. By having the prediction network 300 to tie the size of the embedding dimension $d_e$, to the dimensionality $d_h$ of the last hidden layer of the joint network 250, the feed-forward projection weights of the joint network 250 and the shared embedding matrix 304 of the prediction network 300 can share their weights for all non-blank symbols via a simple transpose transformation. Since the two matrices share all their values, the RNN-T decoder only needs to store the values once on memory, instead of storing two individual matrices. By setting the size of the embedding dimension $d_e$, equal to the size of the hidden layer dimension $d_h$, the RNN-T decoder reduces a number of parameters equal to the product of the embedding dimension $d_e$, and the vocabulary size |V|. This weight tying corresponds to a regularization technique.

In some examples, audio data captured by the audio subsystem 108 is processed into 128-dimensional log-Mel features computed with a 32 millisecond (ms) window and 10 ms shifts, and then stacked with 3 frames to the left and downsampled by a factor of 3 to a 30 ms frame rate.

The Softmax layer 260 may be composed of a unified word piece or grapheme set that is generated using all unique word pieces or graphemes in training data. When the output symbols/labels include wordpieces, the set of output symbols/labels may include 4,096 different word pieces. When the output symbols/labels include graphemes, the set of output symbols/labels may include less than 100 different graphemes.

Figure 4A:
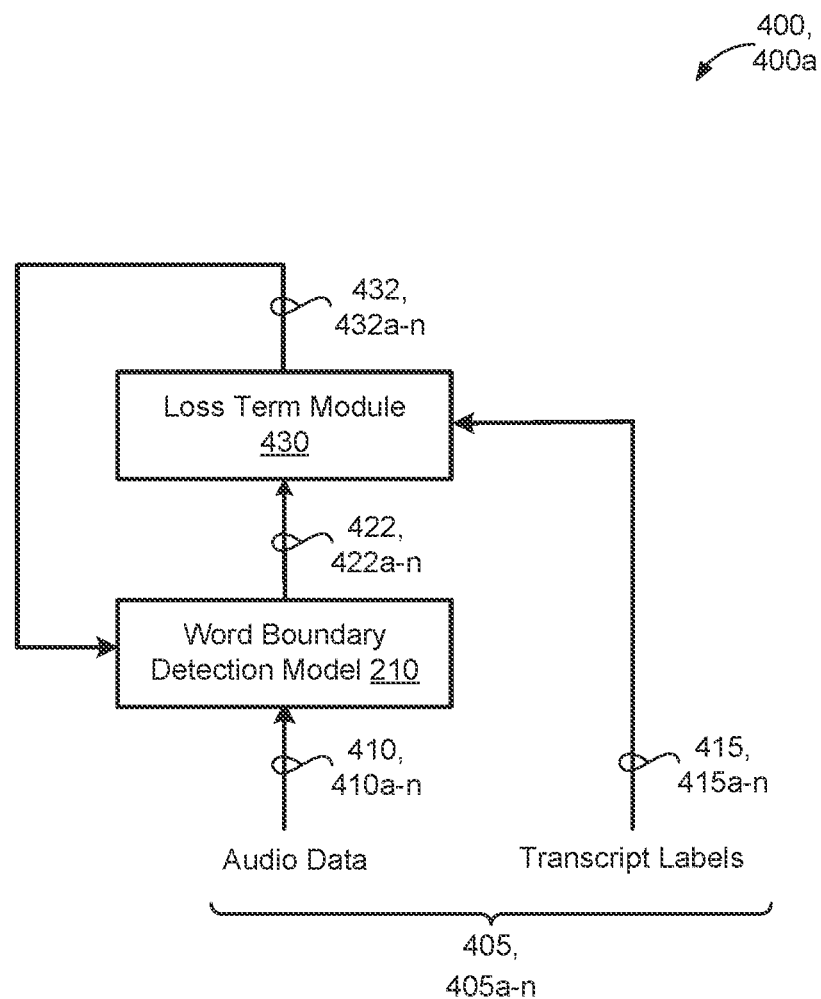
FIG. 4A is a schematic view of an example training process for training the ASR system of FIG. 2.

FIG. 4A is a schematic view of an example training process 400a for training the word boundary detection model 210 of the ASR system 200 (FIG. 2). Here, the training process 400a performs supervised training using paired training samples 405 that include audio-transcript pairs. That is, the training samples 405 include pairs of input training audio frames 410 and corresponding ground-truth transcript labels 415 that are augmented with special boundary tokens (e.g., "<wb>") inserted between pairs of adjacent words. Here, the transcript labels 415 may be annotated by hand. However, the transcript labels may be obtained or generated in any other way. In some examples, the transcript labels 415 are tokenized into wordpiece units.

For each particular training sample 405, the word boundary detection model 210 receives, as input, the input training audio frame 410 of the particular training sample 405. As described in more detail above, the word boundary detection model 210 processes each input training audio frame 410 to determine whether the audio frame 410 corresponds to a word boundary. In particular, the training process 400a trains the word boundary detection model 210 to determine a corresponding output 422 that represents whether or not the corresponding training input audio frame 410 corresponds to a word boundary. Thereafter, a loss term module 430 determines, for each particular training sample 405, a loss term 432 associated with the output 422 of the word boundary detection model 210 for the particular training sample 405 based on the corresponding ground-truth transcription labels 415 for the particular training sample 405.

The training process 400a trains the word boundary detection model 210 by updating or refining parameters of the word boundary detection model 210 based on the loss terms 432. For example, the training process 400a may update parameters of the word boundary detection model 210 based on the loss terms 432 using stochastic gradient descent.

Figure 4B:
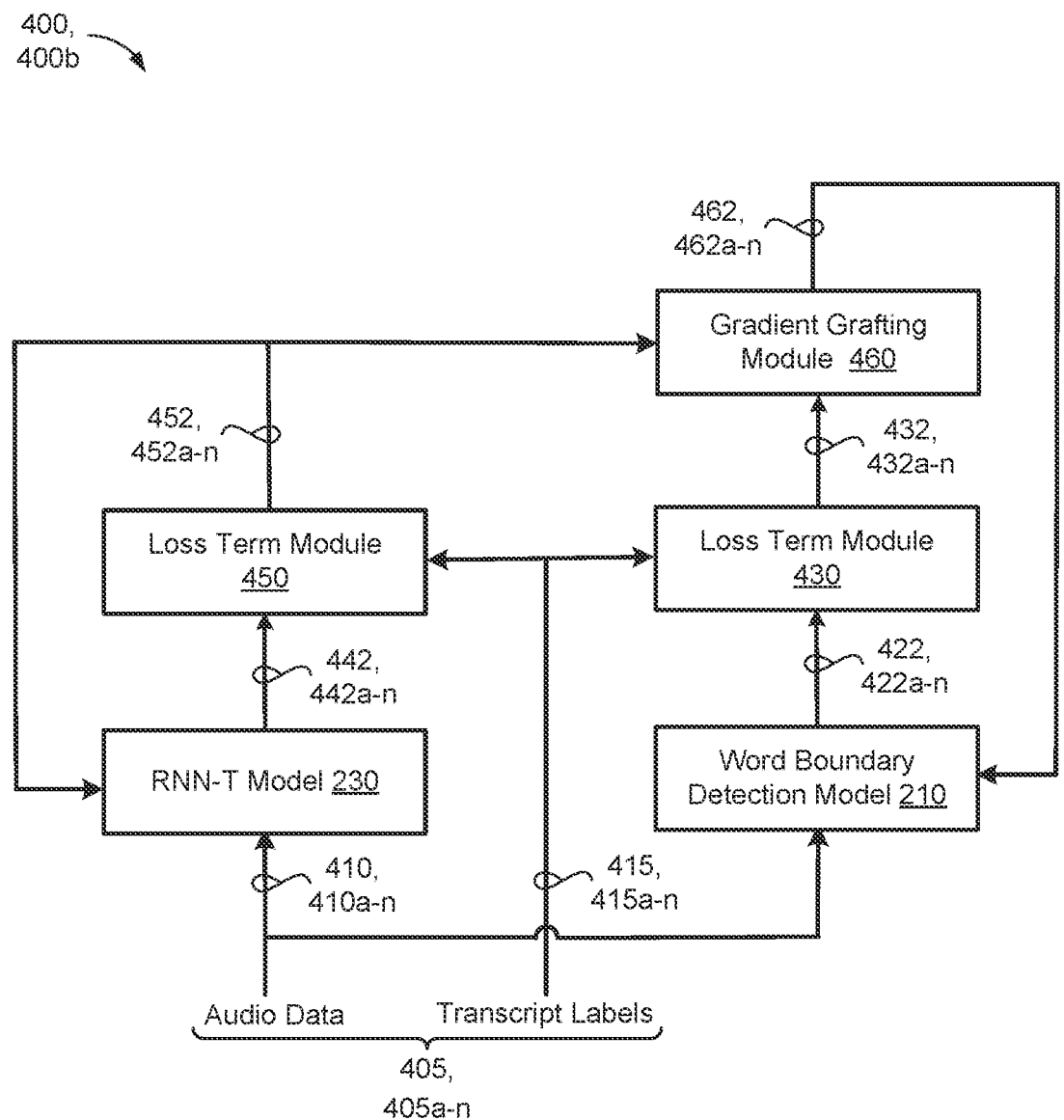
FIG. 4B is a schematic view of another example training process for training the ASR system of FIG. 2.

FIG. 4B is a schematic view of another example training process 400b for training the word boundary detection model 210 of the ASR system 200. Here, the training process 400b performs supervised training using paired training samples, such as the paired training samples 405 described above in connection with the training process 400a of FIG. 4A. The word boundary detection model 210, outputs 422, loss term module 430, and loss terms 432 are described above in connection with FIG. 4a.

For each particular training sample 405, an ASR model 230 receives, as input, the input training audio frame 410 of the particular training sample 405 and processes the input training audio frame 410 to predict a transcription 442 for the particular training sample 405. Thereafter, a loss term module 450 determines, for each particular training sample 405, a loss term 452 associated with the predicted transcript 442 for the particular training sample 405 based on the corresponding ground-truth transcription labels 415 of the particular training sample 405. In some examples, the training process 400b also trains the ASR model 230 by updating or refining parameters of the ASR model 230 based on the loss terms 452. For example, the training process 400b may update parameters of the ASR (e.g., RNN-T) model 230 based on the loss terms 452 using stochastic gradient descent.

A gradient grafting module 460 determines, based on the losses 432 of the word boundary detection model 210 and the losses 452 of the RNN-T model 440, losses 462 that can be used to update the word boundary detection model 210. In an example, the gradient grafting module 460 processes the losses 452 to determine logits $logits_{teacher}$ of the ASR model 230 related to predicting word boundaries, processes the losses 432 to determine logits $logits_{student}$ of the word boundary detection model 210, and determines logits for training the word boundary detection model 210 using, for example, Equation (1). The gradient grafting module 460 can determine, based on the logits, a weighted sum, and apply the weighted sum to the losses 432 to determine the losses 462 for updating the word boundary detection model 210. Alternatively, gradient grafting module 460 can apply the logits as a sole loss function that is used to determine the losses 462 for updating the word boundary detection model 210.

In some examples, the training process 400b trains the word boundary detection model 210 by updating or refining parameters of the word boundary detection model 210 based on the loss terms 462. For example, the training process 400b may update parameters of the word boundary detection model 210 based on the loss terms 462 using stochastic gradient descent.

Figure 5:
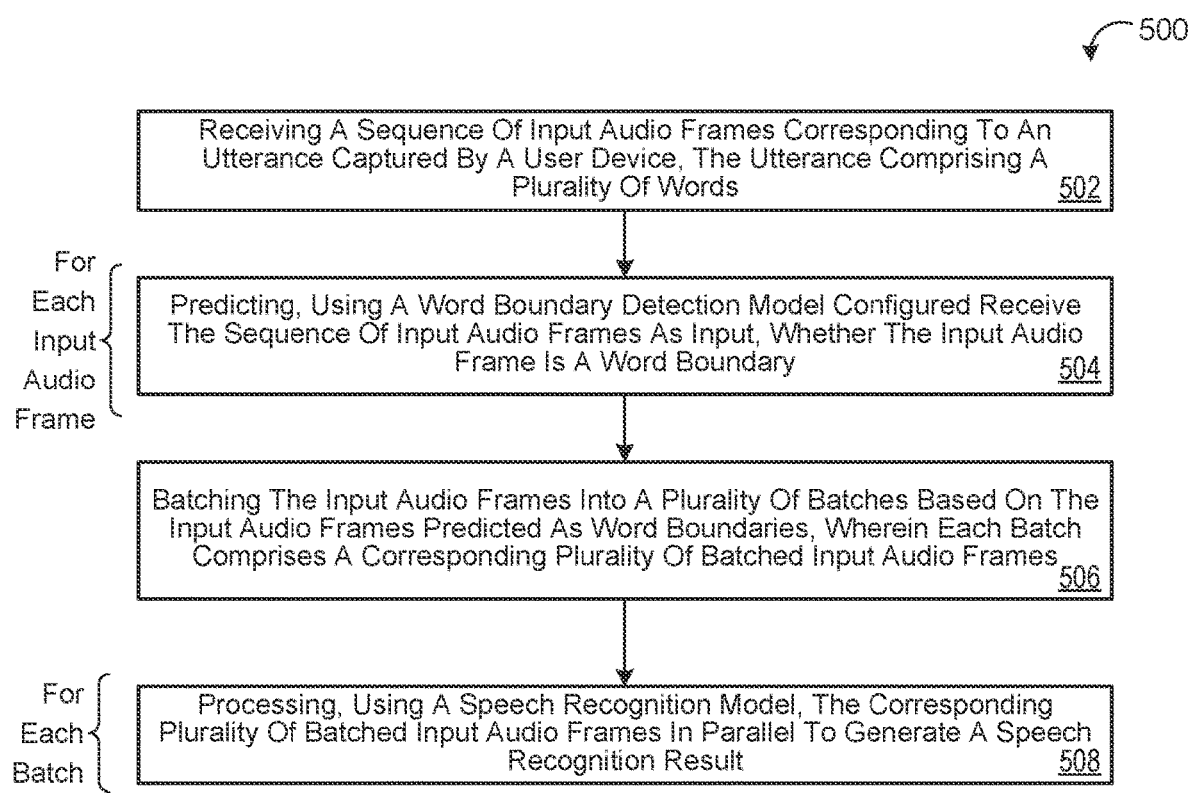
FIG. 5 is a flowchart of an example arrangement of operations for a computer-implemented method of predicting word boundaries for on-device hatching of end-to-end speech recognition models.

FIG. 5 is a flowchart of an exemplary arrangement of operations for a computer-implemented method 500 of predicting word boundaries for on-device batching of end-to-end speech recognition models. At operation 502, the method 500 includes receiving a sequence of input audio frames 110 corresponding to an utterance 106 captured by a user device 10, the utterance 106 including a plurality of words. At operation 504, the method 500 includes, for each input audio frame 110, predicting, using a word boundary detection model (e.g., the word boundary detection model 210) configured receive the sequence of input audio frames 110 as input, whether the input audio frame 110 is a word boundary.

At operation 506, the method 500 includes batching the input audio frames 110 into a plurality of batches 222 based on the input audio frames 110 predicted as word boundaries. Each batch 222 includes a corresponding plurality of batched input audio frames 110. At operation 508, the method 500 includes, for each of the plurality of batches 222, processing, using a speech recognition model (e.g., the RNN-T 230), the corresponding plurality of batched input audio frames 110 in parallel to generate a speech recognition result 232.

Figure 6:
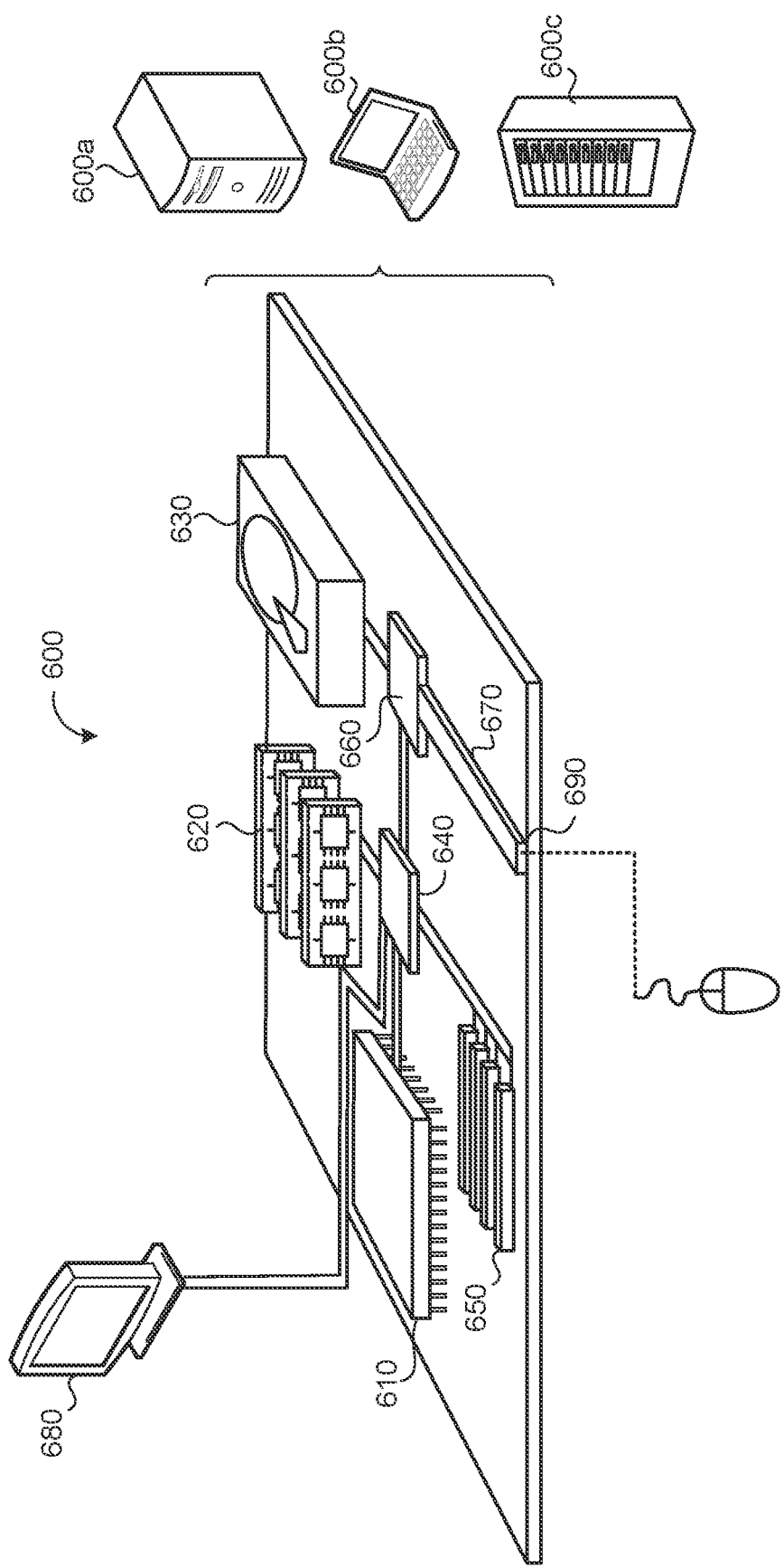
FIG. 6 is a schematic view of an example computing device that can be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document, The computing device 600 includes a processor 610 (i.e., data processing hardware) that can be used to implement the data processing hardware 12 and/or 62, memory 620 (i.e., memory hardware) that can be used to implement the memory hardware 14 and/or 64, a storage device 630 (i.e., memory hardware) that can be used to implement the memory hardware 14 and/or 64, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM) electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a. computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, "or" refers to an inclusive or and not to an exclusive or. For example, "A, B, or C" refers to any combination or subset of A, B, C such as: (1) A alone; (2) B alone; (3) C alone; (4) A with B; (5) A with C; (6) B with C; and (7) A with B and with C. Similarly, the phrase "at least one of A or B" is intended to refer to any combination or subset of A and B such as: (1) at least one A; (2) at least one B; and (3) at least one A and at least one B. Moreover, the phrase "at least one of A and B" is intended to refer to any combination or subset of A and B such as: (1) at least one A; (2) at least one B; and (3) at least one A and at least one B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
   receiving a sequence of input audio frames corresponding to an utterance captured by a user device, the utterance comprising a plurality of uttered words;
   for each respective input audio frame, predicting, using a word boundary detection model configured to receive the sequence of input audio frames as an input, whether the respective input audio frame is a word boundary between an adjacent pair of uttered words of the plurality of uttered words, the word boundary detection model trained on transcript labels augmented with a special boundary token inserted between each adjacent pair of words;
   batching the sequence of input audio frames into a plurality of batches based on the input audio frames predicted as word boundaries, wherein each respective batch comprises a corresponding plurality of batched input audio frames representing a respective one of the plurality of uttered words of the utterance; and
   for each respective batch of the plurality of batches, processing, using a speech recognition model, the corresponding plurality of batched input audio frames in parallel to generate a speech recognition result for the respective one of the plurality of uttered words.

2. The computer-implemented method of claim 1, wherein the word boundary detection model is different than the speech recognition model.

3. The computer-implemented method of claim 1, wherein the speech recognition model comprises a first speech recognition model, and the word boundary detection model comprises a second speech recognition model.

4. The computer-implemented method of claim 3, wherein:
the transcript labels are tokenized into wordpiece units; and
the first speech recognition model predicts wordpiece units to generate the speech recognition result.

5. The computer-implemented method of claim 3, wherein:
the first speech recognition model is trained as a teacher model using the transcript labels augmented with the special boundary token inserted between each adjacent pair of words; and
the second speech recognition model is trained as a student model by performing gradient grafting that determines a loss of logits of the teacher model and applies a gradient of the loss of logits of the teacher model to weights of the student model.

6. The computer-implemented method of claim 3, wherein the second speech recognition model comprises a miniaturized speech recognition model.

7. The computer-implemented method of claim 1, wherein:
a first batch of the plurality of batches contains a first number of input audio frames of the sequence of input audio frames; and
a second batch of the plurality of batches contains a different second number of input audio frames of the sequence of input audio frames.

8. The computer-implemented method of claim 7, wherein:
the input audio frames of the first batch represent a first uttered word; and
the input audio frames of the second batch represent a different second uttered word.

9. The computer-implemented method of claim 1, wherein each respective batch of the plurality of batches includes all of the input audio frames of the sequence of input audio frames representing an entirety of the respective one of the plurality of uttered words.

10. The computer-implemented method of claim 1, wherein the speech recognition model comprises a transducer-based speech recognition model that comprises an encoder network, a prediction network, and a joint network.

11. The computer-implemented method of claim 10, wherein the encoder network comprises a plurality of multi-headed attention layers.

12. The computer-implemented method of claim 10, wherein:
the prediction network is configured to, at each of a plurality of time steps subsequent to an initial time step:
receive, as an input, a sequence of non-blank symbols output by a final softmax layer;
for each non-blank symbol in the sequence of non-blank symbols received as an input at the corresponding time step:
generate, using a shared embedding matrix, an embedding of the corresponding non-blank symbol;
assign a respective position vector to the corresponding non-blank symbol; and
weight the embedding proportional to a similarity between the embedding and the respective position vector; and
generate, as an output, a single embedding vector at the corresponding time step, the single embedding vector based on a weighted average of the weighted embeddings; and
the joint network is configured to, at each of the plurality of time steps subsequent to the initial time step:
receive, as an input, the single embedding vector generated as an output from the prediction network at the corresponding time step; and
generate a probability distribution over possible speech recognition hypotheses at the corresponding time step.

13. The computer-implemented method of claim 12, wherein the prediction network ties a dimensionality of the shared embedding matrix to a dimensionality of an output layer of the joint network.

14. A system comprising:
data processing hardware; and
memory hardware in communication with the data processing hardware, the memory hardware storing instructions that when executed on the data processing hardware cause the data processing hardware to perform operations comprising:
receiving a sequence of input audio frames corresponding to an utterance captured by a user device, the utterance comprising a plurality of uttered words;
for each respective input audio frame, predicting, using a word boundary detection model configured to receive the sequence of input audio frames as an input, whether the respective input audio frame is a word boundary between an adjacent pair of uttered words of the plurality of uttered words, the word boundary detection model trained on transcript labels augmented with a special boundary token inserted between each adjacent pair of words;
batching the sequence of input audio frames into a plurality of batches based on the input audio frames predicted as word boundaries, wherein each respective batch comprises a corresponding plurality of batched input audio frames representing a respective one of the plurality of uttered words of the utterance; and
for each respective batch of the plurality of batches, processing, using a speech recognition model, the corresponding plurality of batched input audio frames in parallel to generate a speech recognition result for the respective one of the plurality of uttered words.

15. The system of claim 14, wherein the word boundary detection model comprises is different than the speech recognition model.

16. The system of claim 14, wherein the speech recognition model comprises a first speech recognition model, and the word boundary detection model comprises a second speech recognition model.

17. The system of claim 16, wherein:
the transcript labels are tokenized into wordpiece units; and
the first speech recognition model predicts wordpiece units to generate the speech recognition result.

18. The system of claim 16, wherein:
- the first speech recognition model is trained as a teacher model using the transcript labels augmented with the special boundary token inserted between each adjacent pair of words; and
- the second speech recognition model is trained as a student model by performing gradient grafting that determines a loss of logits of the teacher model and applies a gradient of the loss of logits of the teacher model to weights of the student model.

19. The system of claim 16, wherein the second speech recognition model comprises a miniaturized speech recognition model.

20. The system of claim 14, wherein:
- a first batch of the plurality of batches contains a first number of input audio frames of the sequence of input audio frames; and
- a second batch of the plurality of batches contains a different second number of input audio frames of the sequence of input audio frames.

21. The system of claim 20, wherein:
- the input audio frames of the first batch represent a first uttered word; and
- the input audio frames of the second batch represent a different second uttered word.

22. The system of claim 14, wherein each respective batch of the plurality of batches includes all of the input audio frames of the sequence of input audio frames representing an entirety of the respective one of the plurality of uttered words.

23. The system of claim 14, wherein the speech recognition model comprises a transducer-based speech recognition model that comprises an encoder network, a prediction network, and a joint network.

24. The system of claim 23, wherein the encoder network comprises a plurality of multi-headed attention layers.

25. The system of claim 23, wherein:
- the prediction network is configured to, at each of a plurality of time steps subsequent to an initial time step:
  - receive, as an input, a sequence of non-blank symbols output by a final softmax layer;
  - for each non-blank symbol in the sequence of non-blank symbols received as an input at the corresponding time step:
    - generate, using a shared embedding matrix, an embedding of the corresponding non-blank symbol;
    - assign a respective position vector to the corresponding non-blank symbol; and
    - weight the embedding proportional to a similarity between the embedding and the respective position vector; and
  - generate, as an output, a single embedding vector at the corresponding time step, the single embedding vector based on a weighted average of the weighted embeddings; and
- the joint network is configured to, at each of the plurality of time steps subsequent to the initial time step:
  - receive, as an input, the single embedding vector generated as an output from the prediction network at the corresponding time step; and
  - generate a probability distribution over possible speech recognition hypotheses at the corresponding time step.

26. The system of claim 25, wherein the prediction network ties a dimensionality of the shared embedding matrix to a dimensionality of an output layer of the joint network.

* * * * *